United States Patent [19]

Dufft

[11] Patent Number: 4,645,259
[45] Date of Patent: Feb. 24, 1987

[54] ACTUATOR FOR AN OPENABLE VEHICLE ROOF

[75] Inventor: Jurgen Dufft, Erdington, United Kingdom

[73] Assignee: Tudor Webasto Limited, Birmingham, England

[21] Appl. No.: 789,957

[22] PCT Filed: Mar. 5, 1985

[86] PCT No.: PCT/GB85/00090
§ 371 Date: Oct. 4, 1985
§ 102(e) Date: Oct. 4, 1985

[87] PCT Pub. No.: WO85/03910
PCT Pub. Date: Sep. 12, 1985

[30] Foreign Application Priority Data

Mar. 6, 1984 [GB] United Kingdom ............... 8405856
Aug. 16, 1984 [GB] United Kingdom ............... 8420818

[51] Int. Cl.[4] .................. B60J 7/08; E05F 11/20; E05F 11/34
[52] U.S. Cl. .................. 296/223; 296/218; 296/224; 292/263; 49/359
[58] Field of Search ............... 296/216, 217, 218, 223, 296/224; 292/263; 49/359

[56] References Cited

U.S. PATENT DOCUMENTS 3,949,625 4/1976 Bienert .................. 296/224 X
3,979,148 9/1976 Martin .
4,118,063 10/1978 Bienert et al. ............... 296/218 X
4,165,120 8/1979 Jardin et al. ............... 296/217

FOREIGN PATENT DOCUMENTS 2813651 10/1979 Fed. Rep. of Germany .
2948657 6/1981 Fed. Rep. of Germany .
3114502 2/1982 Fed. Rep. of Germany .
2370602 6/1978 France .

Primary Examiner—Robert B. Reeves
Assistant Examiner—Dennis H. Pedder
Attorney, Agent, or Firm—Cushman, Darby & Cushman

[57] ABSTRACT

An actuator for an openable vehicle roof of the kind comprising a panel, one edge of which can be swung outwardly, comprises a mounting member (6) for mounting the actuator to a fixed part of the vehicle roof, a body portion (5) hinged about a shaft (11) to the mounting member, a pair of arms (4) fixed on a cross shaft (17) to extend in a common plane, the shaft (17) being carried rotatably by the body portion and pivotally connected to the roof panel, a worm (1) in the body portion and turnable by a hand wheel (3), and a worm follower wheel (2) fixed on shaft (7) between the arms (4), such that rotation of the worm produces angular displacement of the arm member with respect to the body portion.

10 Claims, 6 Drawing Figures

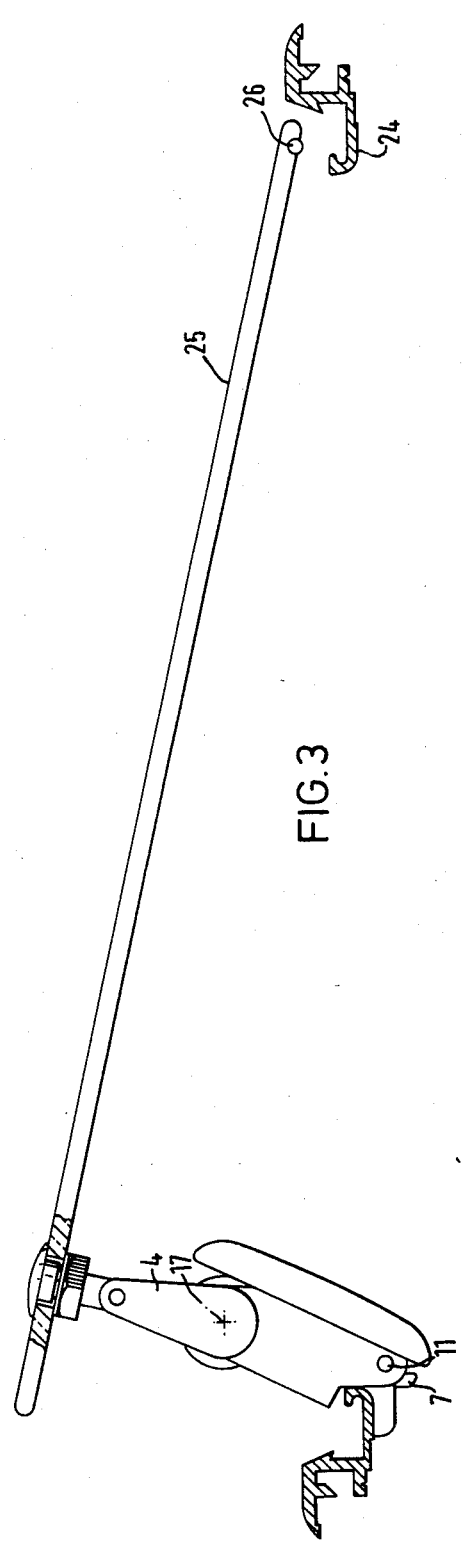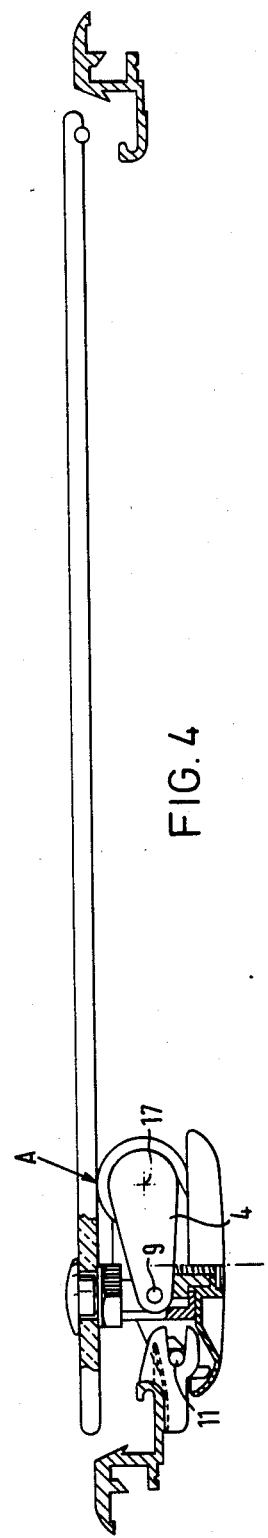
FIG.3
FIG.4

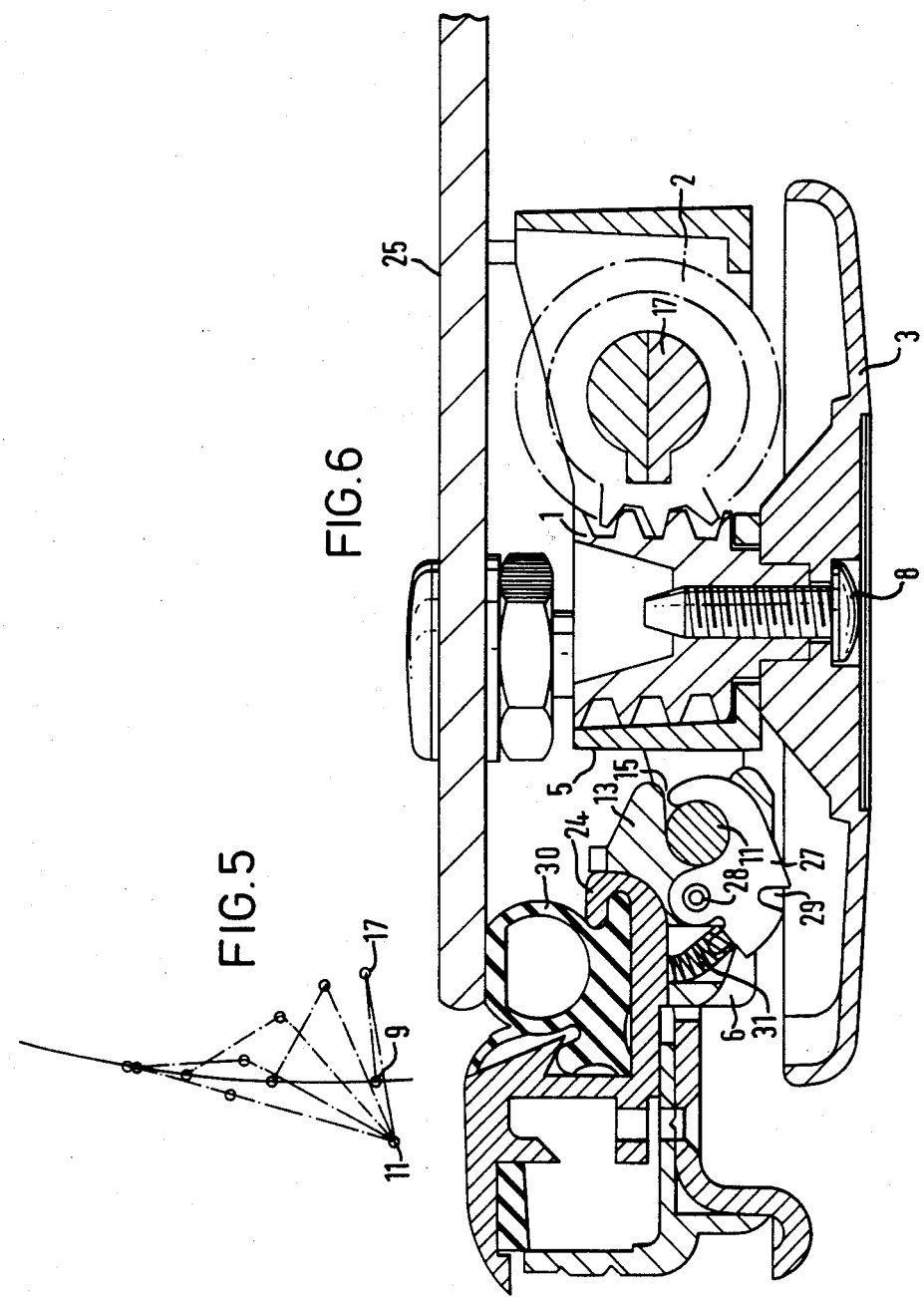

ACTUATOR FOR AN OPENABLE VEHICLE ROOF

The present invention relates to actuators for openable vehicle roofs of the kind having a panel, one edge of which can be swung outwardly, e.g. a sunroof for a vehicle.

In a typical glass sunroof arrangement, a frame and seal is ridigly mounted in an opening in the vehicle roof. A safety glass panel is hinged to the forward edge of the frame and has an opening and locking mechanism at the rear of the frame.

When opened, the rear edge of the glass panel rises above the frame, thus providing ventilation to the vehicle interior without admitting direct air from the front of the sunroof which is kept in contact with the frame seal by the hinges at the front edge of the glass panel.

When closed, the mechanism, commonly known as "the handle", holds the glass panel in contact with the seal, so making a water and air-tight joint.

Similar openable roofs may be made in which the panel is not glass but is, for instance, metal.

The handle is generally also designed such as it allows disconnection of the panel from the frame and therefore removal from the vehicle giving an unrestricted opening in the vehicle roof.

A handle, as described, allows for just three modes of operation, i.e. (a) fully open, (b) with the panel fully removed and finally, (c) closed. In the open position, it is inevitably a compromise that only a fixed amount of opening is permitted. Handles of the kind described in failing to allow for a partially opened position do not allow for regulation of the ventilation depending on forward movement of the vehicle to draw air from the vehicle interior. While the opening has to be adequately large to be effective at low vehicle speeds, it becomes too large at high speeds, on motorways for instance, and with the increase in ventilation comes a rapid increase in wind noise across the opening.

The present invention provides an actuator for an openable vehicle roof for a motor vehicle of the kind comprising a panel, one edge of which can be swung outwardly, which actuator comprises a mounting member for mounting the actuator to a fixed part of the vehicle, a body portion hinged to the mounting member, an arm member carried by the body portion for connection to the openable roof panel and a worm associated with the body portion engaged with a worm follower member associated with the arm member, such that rotation of the worm produces angular displacement of the arm member with respect to the body portion.

Preferably, the body portion comprises a housing member having said mounting member and said arm member pivotably mounted thereon for pivoting about spaced substantially parallel axes.

Preferably, the worm extends in said housing member between said parallel axes with its own axis substantial perpendicular thereto.

Preferably a handle for manual rotation of the worm is connected thereto.

Preferably the arm member comprises a shaft bearing an arm extending transversely thereof, the shaft forming a pivot axis for the arm.

In such an arrangement, the worm follower member is preferably non-rotatably mounted on the shaft of said arm member.

Preferably, the shaft of the arm member bears a pair of arms extending transversely to one side thereof in substantially a common plane.

Said arms may diverge from one another, e.g. may be set at an angle up to approximately right-angles to one another and each at up to approximately 45° to the shaft.

Preferably, the worm follower member lies on the shaft of the arm member betwen said arms.

There will normally be provided a connecting member for connecting the arm member to the roof panel, which connecting member is pivoted to the arm member, normally at the distal end thereof.

Preferably, the actuator has an open position in which said arm member extends away from said body portion such that the hinge of the mounting member to the body portion, the connection of the arm member to the body portion and the distal end of the arm member lie substantially in a common plane.

Preferably, the actuator has a closed position in which the arm member overlies the body portion, once again such that the hinge of the mounting member to the body portion, the connection of the arm member to the body portion and the distal end of the arm member lie substantially in a common plane.

The invention includes an openable roof assembly for a motor vehicle comprising a frame defining an opening, a panel for closing the opening hinged at one edge to the frame and an actuator as described above connected between the frame and the edge of the panel opposite the hinge thereof.

The invention includes a motor vehicle incorporating a roof of the kind described.

The panel in such a roof for such a vehicle preferably is a glass panel.

The invention will be illustrated by the following description of a preferred embodiment thereof with reference to the accompanying drawings in which:

FIG. 1 is a fore and aft cross-section through an actuator according to the invention, FIG. 2 is a partially cut-away view of the actuator of FIG. 1 from the rear, FIG. 3 is a side view of the roof incorporating the actuator of FIG. 1 in the fully open position, FIG. 4 is a side view showing the roof of FIG. 3 in the closed position, partially cut-away, and FIG. 5 is a kinematic diagram showing the position of the roof against positions of the actuator handle.

FIG. 6 is a force and aft cross section through a second type of actuator according to the invention.

As shown in FIGS. 1 and 2, an actuator according to the invention comprises a mounting member or pivot block 6 mountable to the frame 24 of an openable roof. Hinged to the mounting member or pivot block 6 is a body portion of the actuator. The body portion comprises a housing 5. The housing 5 defines a generally cylindrical open-topped chamber having extending therefrom on one side a pair of spaced parallel lugs 12 between which is received a projecting nose 13 of the mounting member 6. Extending in the opposite direction from lugs 12 are a pair of lugs 14 which extend away from the cylindrical portion of the housing generally parallel to one another and to which is mounted the arm member of the actuator.

The nose 13 of the mounting member 6 has an inwardly extending slot 15. A pivot pin 11 passes through a pair of aligned bores in the lugs 12 and the nose 13 is passed over the pivot pin 11 until the pivot pin 11 reaches the inward end of the slot 15. A locking member 7 is in the form generally of an inverted U, having one leg elongated to extend below the other. The longer leg of the locking member 7 passes through a bore 16 extending downwardly through the nose 13 of the mounting member 6 tangential to the inward end of the slot 15. In the upper part of the nose 13 of the mounting member 6, the bore 16 is enlarged to receive the crossmember and shorter leg of the U-shaped locking member 7 whereby the pin 11 is trapped between the legs of the U-shaped member.

With the locking element 7 in place, the nose 13 of the mounting member, the lugs 12 of the housing and the pin 11 form a hinge connecting the mounting member to the body portion of the actuator.

A leaf spring 10 extends from the body of the mounting member 6 over the locking element 7 received in the nose 13 of the mounting member 6 biasing locking member 7 down to hold pin 11 in the slot 15.

The actuator comprises an arm member comprising a shaft 17 bearing at each end an arm 4. The arms 4 extend from the shaft substantially in a common plane, somewhat mutually divergent. The arms 4 are preferably each generally in the shape of a quarter circle arc so that together they lie neatly above one half of the hand wheel 3 described below.

Shaft 17 is received in apertures in the lugs 14 of the housing 5 so that the shaft 17 and the pin 11 form axes of rotation for the arm member and the body portion which are substantially parallel and which lie at opposite sides of the housing 5.

Between the arms 4 and non-rotatably mounted on the shaft 17 is a worm follower member in the form of worm wheel 2. The central cylindrical chamber of the housing 5 has an axially extending slot cutting through the wall of the housing immediately adjacent the worm wheel 2 and through which protrude the teeth of the worm wheel 2 to enter the interior of said cylindrical chamber.

Contained within said chamber is a worm 1 mounted with its axis coincident with the axis of the cylindrical chamber of the housing 5. The housing 5 has a circular bore 18 having an axis coincident with the worm 1 and a diameter somewhat less than the body portion of the worm 1 disposed at the closed end of the cylindrical chamber of the housing. A boss 19 of the worm extends out of the housing through the bore 18. A hand wheel 3 has a cylindrical recess 20 which is passed over the protruding boss 19 of the worm. The hand wheel 3 is secured to the worm by a machine screw 8 engaged with a female thread formed in the boss 19.

The hand wheel 3 is of a diameter sufficient to encompass the whole of the housing 5. In particular, edge portions of the hand wheel 3 overlie the bottom of the locking member 7 when the actuator is in the position shown.

Each of the arms 4 at its distal end has a through bore receiving a pivot pin 9 and has an inwardly extending slot 21 dividing the end of each arm 4 into a fork within which is received a lug 22 of a connecting element 23 for connecting the arm to the panel of the openable roof. Pivot pin 9 passes through a bore in the lug 22 to pivot the connecting element 23 to its respective arm 4. The fixings for fastening the connecting element 23 to the panel are of conventional nature and need not be further described.

In operation, rotation of the hand wheel 3 causes rotation of the worm 1 which is connected thereto and hence angular rotation of the shaft 17 by virtue of engagement of the worm wheel 2 acting as a worm follower member. Rotation of the shaft 17 causes angular displacement of the arms 4 of the arm member of the actuator with respect to the body portion.

As shown in FIG. 3, the actuator may be incorporated in a roof assembly comprising a frame 24 defining an aperture and a glass panel 25 closing the aperature and hinged at one edge by a hinge 26 to the frame. The actuator has an open position in which the arms 4 extend almost as a continuation of a line joining the pivot pin 11 and the shaft 17.

As shown in FIG. 4, the actuator has a closed position in which the arms 4 overlie the body portion, passing either side of the cylindrical chamber of the housing 5 containing the worm 1. In the closed position, the pivot pin 11, the shaft 17 and the pivot pins 9 at the distal ends of the arms 4 lie once again almost in a common plane, bringing the panel of the opening roof into a closed position.

It can been seen that in the closed position and in the partially open position shown in FIG. 1, the lower end of the longer leg of the locking member 7 is covered by the hand wheel 3. In the fully open position however, pivoting about the pin 11 of the mounting member 6 has carried the hand wheel 3 away from the lower end of the locking member 7. In this position, the locking member 7 can be pressed upwardly, e.g. by finger pressure, against spring 10. This raises the shorter aram of the locking member 7 sufficiently to free pin 11 in slot 15 so that it may be withdrawn from the slot, thus disconnecting the body portion of the actuator from its mounting member and allowing the complete removal of the panel from the roof.

In the actuator illustrated, the whole actuator is assembled from plastic components with the exception of the pin 11, the pivot pins 9, the leaf spring 10 and the machine screw 8.

The fixings to the panel itself are also of metal but do not form part of the actuator proper.

The gear ratio of the actuator is typically such that one turn of the hand wheel corresponds to 48° of movement of the lifting arms 4, a ratio of 7.5:1. This is a compromise to ensure easy operation and to prevent shake down in the part open position when travelling over rough ground.

Rotation of the hand wheel causes a movement of the lifting arms which is, in effect, an increase in the centre distance of the pivots 9 and 11, thus pushing the panel forward and upward. Forward movement is restrained by the hinges at the opposite edge of the panel (shown symbolically). The panel therefore rises, rotating about the said hinges. Further rotation of the hand wheel extends the glass panel until pivots 9 and 11 and the lifting arm axes lie in a straight line.

On the other hand, when the hand wheel is rotated in the opposite direction to bring the actuator into a closed position, the worm wheel 2 rests against the panel at point "A" of FIG. 4, so that the actuator body assembly forms a pivot at the point "A" between the hinge at the opposite edge of the panel and the connecting element 23 so that the closing force exerted by the actuator on the panel is almost directly perpendicular to the seal between the frame and the panel at the openable edge.

FIG. 5 shows the relationship between the position of the hand wheel 3 and the roof panel as well as the position of the lifting arm pivot 17.

FIG. 6 illustrates a second embodiment according to the invention which differs from that of FIG. 1 mainly in respect of the release mechanism associated with the hinge between the body portion and the mounting member.

Figure 1:
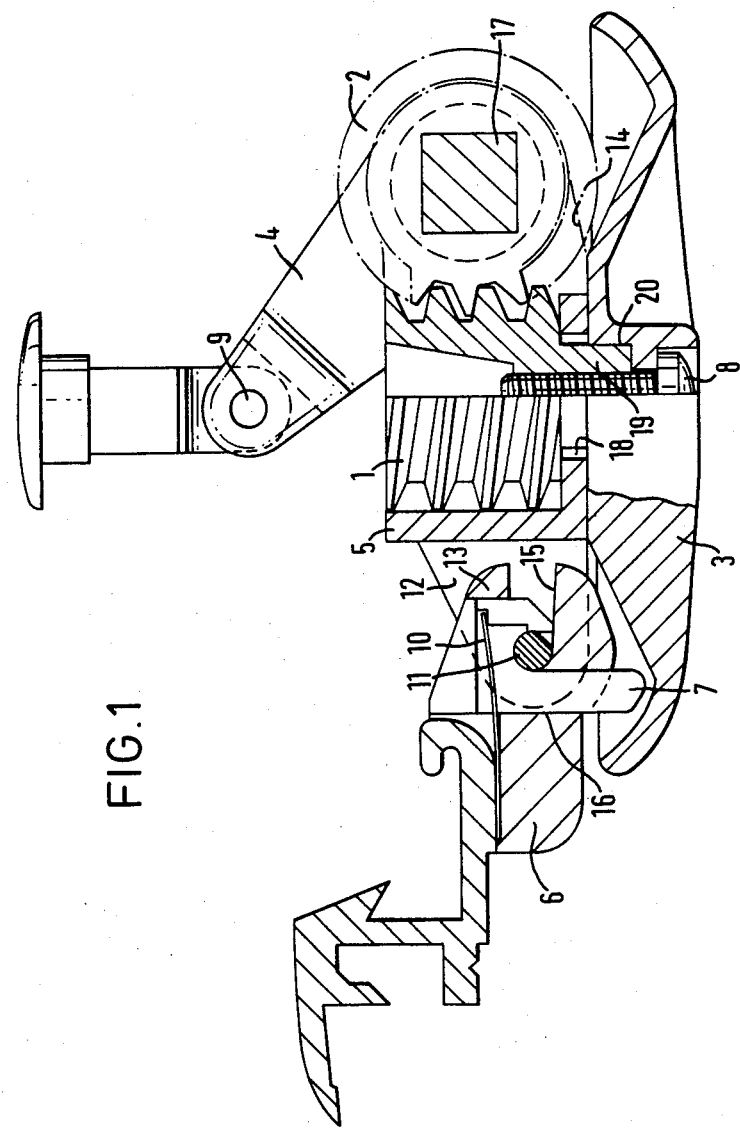
Figure 2:
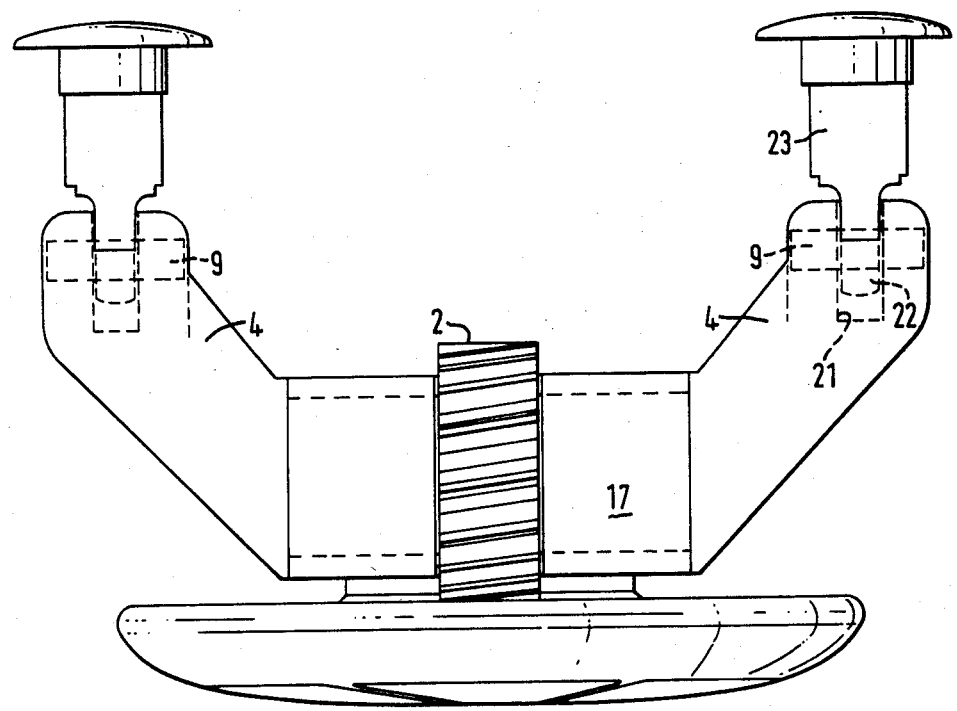

The actuator is shown in the roof-closed position. The mounting member 6 comprises as in FIG. 1 a nose 13 with an inwardly extending horizontally running slot 15 in which is received a pivot pin 11. A jaw 27 lies in a substantially vertical plane and occupies a vertical slot in the lower part of nose 13. A hooked end of jaw 27 extends upwardly to retain pin 11 in slot 15. Jaw 27 is mounted on a horizontally running pivot pin 28 which lies parallel to and spaced from pivot pin 11. At its rear end, i.e. the end opposite the hooked end, jaw 27 is urged to bite on the pivot pin 11 by a coil compression spring 31 running in a bore through the mounting member 6 and compressed between the roof frame 24 and the jaw 27. Jaw 27 has an exposed notch 29 on a lower part of its edge by means of which it may be engaged, e.g. with a screwdriver blade, to force back jaw 27 from the pivot pin 11, thus releasing the body portion from the mounting member.

By means of this release mechanism, the body portion and arm member may be assembled to the panel whilst the mounting member is separately assembled to the roof frame and the actuator may then simply be clipped together by pushing pivot pin 11 into slot 15 having retracted jaw 27.

A flexible seal 30 is provided surrounding the roof opening against which the panel abuts sealingly in the closed position.

In this embodiment, shaft 17 is circular with an axially running key integrally moulded thereon engaging in an axially running slot in the worm follower 2.

It can be seen that the general arrangement of the actuators illustrated is such as to provide an extremely compact mechanism with a neat appearance when closed. In contrast to a conventional over centre or toggle handle, the present arrangement allows a much shallower installation whilst providing a very large opening as pivots 9 and 11 do not need to be positioned so that one is above the other in order to achieve a satisfactory minimum sealing pressure.

A main feature of the designs illustrated is the stepless adjustment of the panel opening thus affording the vehicle occupants with the desired degree of ventilation and control of wind noise.

A further advantage of the illustrated embodiments is safety in operation. Unlike conventional toggle handles, the actuators shown cannot trap fingers under the weight of the glass of the panel. In summary, the actuators shown allow an extremely shallow installation of neat appearance when closed, but allow a very large opening and allow stepless adjustment of the opening.

I claim:

1. An actuator for an openable vehicle roof for a motor vehicle of the kind comprising a panel, one edge of which can be swung outwardly, said actuator comprising a mounting member for mounting the actuator to a fixed part of the vehicle, a body portion hinged adjacent one end to the mounting member, an arm member hinged to the body portion adjacent a second end of the body portion for connection to the openable roof panel and a worm carried by the body portion and engaged with a worm follower member carried by the arm member, such that rotation of the worm produces angular displacement of the arm member with respect to the body portion.

2. An actuator as claimed in claim 1, wherein the body portion comprises a housing member having said mounting member and said arm member pivotably mounted thereon for pivoting about spaced substantially parallel axes.

3. An actuator as claimed in claim 2, further characterised in that wherein the worm extends in said housing member between said parallel axes with its own axis substantially perpendicular thereto.

4. An actuator as claimed in claim 1, wherien the arm member comrpises a shaft bearing an arm extending transversely thereof, the shaft forming a pivot axis for the arm.

5. An actuator as claimed in claim 4, wherein the shaft of the arm member bears a pair of arms extending transversely to one side thereof in substantially a common plane.

6. An actuator as claimed in claim 5, wherein the worm follower member lies on the shaft of the arm member between said arms.

7. An actuator as claimed in claim 1, further including a connecting member for connecting the arm member to the roof panel, which connecting member is pivoted to the arm member.

8. An actuator as claimed in claim 1, wherein the actuator has an open position in which said arm member extends away from said body portion such that the hinge of the mounting member to the body portion, the connection of the arm member to the body portion and the distal end of the arm member lie substantially in common plane.

9. An actuator as claimed in claim 8, further characterised in that the actuator has a closed position in which the arm member overlies the body portion, such that the hinge of the mounting member to the body portion, the connection of the arm member to the body portion and the distal end of the arm member lie substantially in a common plane.

10. An openable roof assembly for a motor vehicle comprising a frame defining an opening, a hinged panel for closing the opening and an actuator connected between the frame and an edge of the panel, said actuator including a mounting member for mounting to said frame, a body portion hinged adjacent one end to the mounting member, an arm member hinged to the body portion adjacent a second end of the body portion for connection to said panel, a worm carried by the body portion, and engaged with a worm followr member carried by said arm member such that rotation of the worm produces angular displacement of the arm member with respect to the body portion.

* * * * *